(No Model.)  3 Sheets—Sheet 1.
F. J. PATTEN.
MULTIPLEX TELEGRAPHY.
No. 395,510.  Patented Jan. 1, 1889.
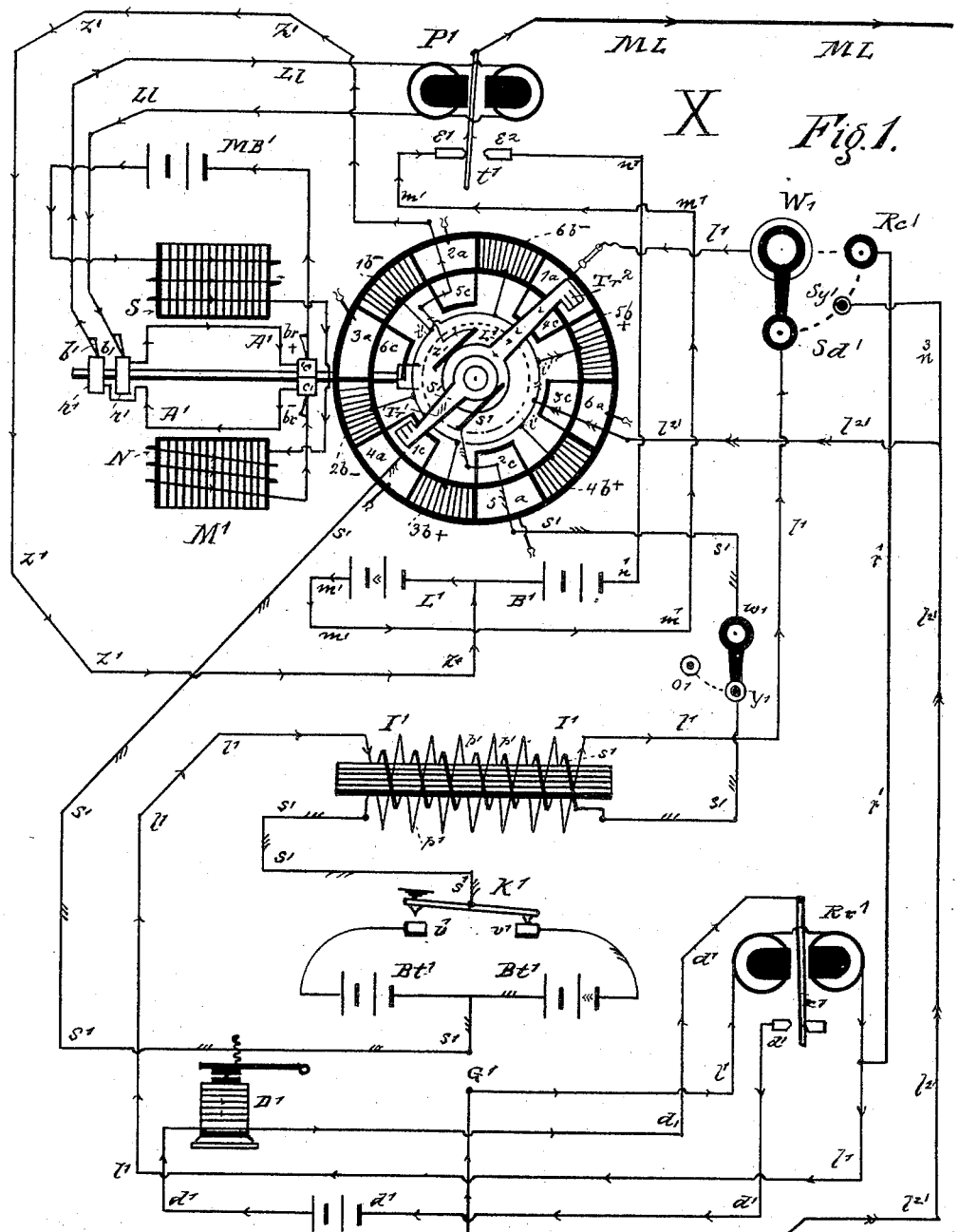
WITNESSES:
W. H. Pumphrey.
W. A. Roberts.
INVENTOR,
Francis Jarvis Patten.
BY Ross H. Read
ATTORNEY.

(No Model.)  3 Sheets—Sheet 2.
F. J. PATTEN.
MULTIPLEX TELEGRAPHY.
No. 395,510.  Patented Jan. 1, 1889.
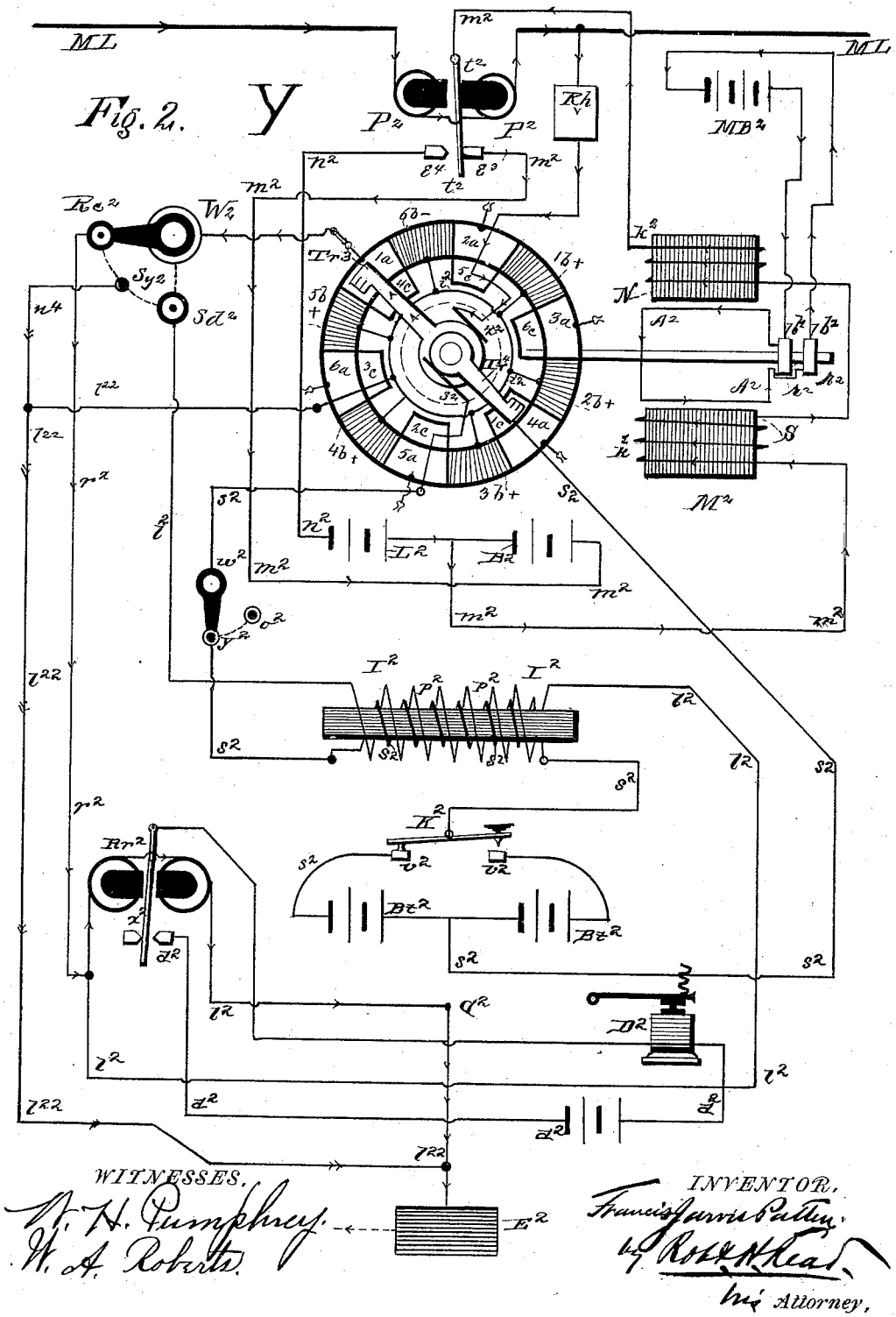

(No Model.)
F. J. PATTEN.
MULTIPLEX TELEGRAPHY.
No. 395,510. Patented Jan. 1, 1889.
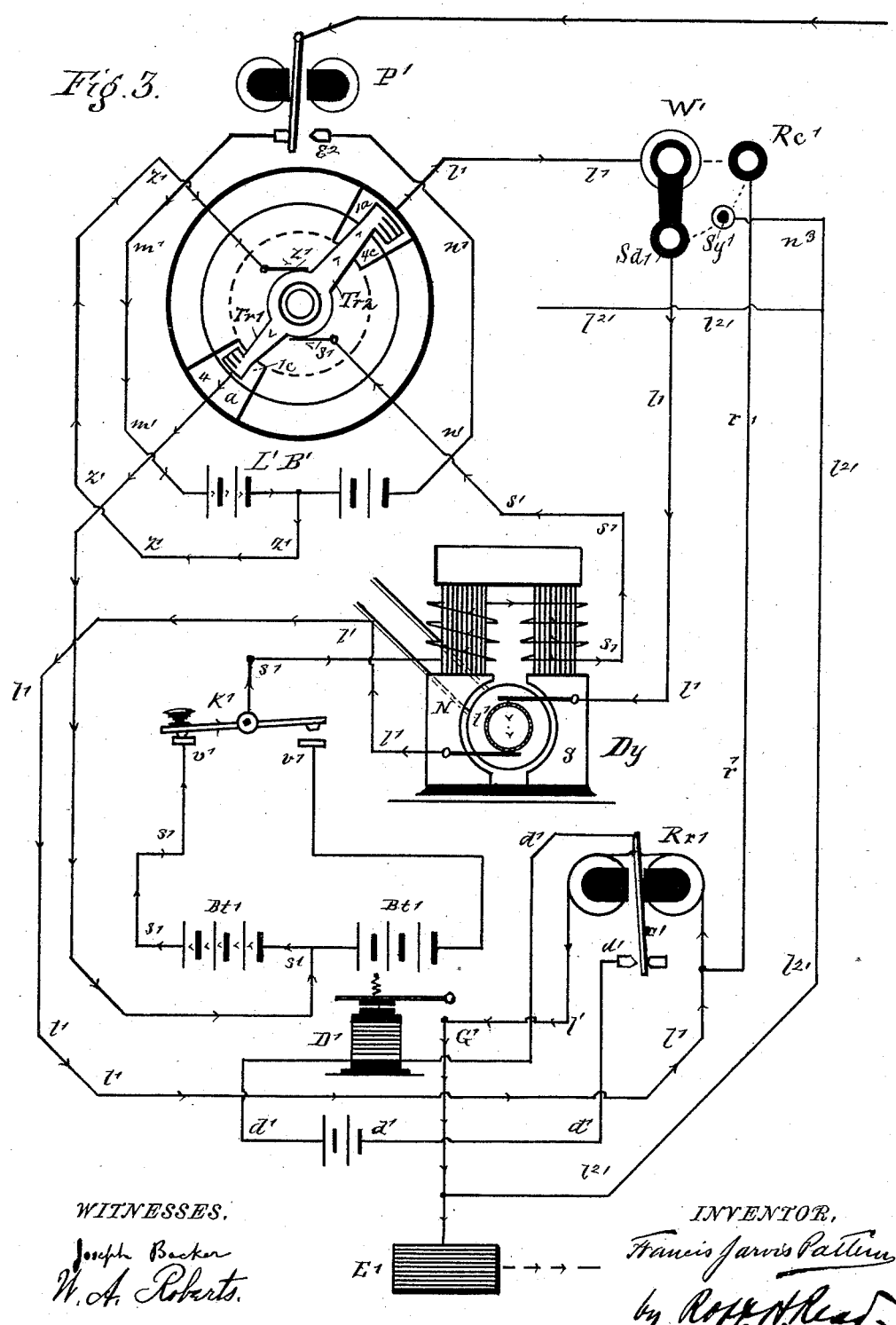

UNITED STATES PATENT OFFICE.

FRANCIS JARVIS PATTEN, OF NEW YORK, N. Y., ASSIGNOR TO J. M. SEYMOUR, OF SAME PLACE.

MULTIPLEX TELEGRAPHY.

SPECIFICATION forming part of Letters Patent No. 395,510, dated January 1, 1889.

Application filed October 24, 1888. Serial No. 289,025. (No model.)

*To all whom it may concern:*

Be it known that I, FRANCIS JARVIS PATTEN, a citizen of the United States, residing at New York, in the county of New York and State of New York, have invented certain new and useful Improvements in Multiplex Telegraphy, (for which I have filed an application for Letters Patent in France, dated November 13, 1888;) and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to telegraphy, and particularly to that class of telegraphic systems known as "multiplex," in which a number of operators may simultaneously use the same line-wire for the transmission of messages. Of the many systems of this character heretofore proposed some—as duplex and quadruplex systems—depend for their operation on the use of receiving-instruments corresponding to different operators and adapted to respond to different strengths or polarities of current. Others depend on the use of current-distributing apparatus, known as "sunflowers," at the several stations, rotating brushes being kept in synchronous rotation by electrically-controlled step-by-step devices, which apparatus gives each of a series of local stations the exclusive use of the line-wire for a portion of each increment of time during which the apparatus is in use. My invention belongs, generically, to the latter type.

In prior applications filed by me I have described and claimed a novel manner of preserving synchronism of the distributing apparatus. In my application, Serial No. 288,294, filed October 7, 1888, I have described a system in which the signaling-current is an induced current, and the induced current is adapted at exactly the proper moment to proceed to line when a local branch is connected by the rotating distributer in operative relation to said line. In that system I used a line-wire for the synchronizing-currents and an independent line-wire for the signaling-currents.

According to my present invention a single line-wire is made to carry both currents, and yet the effect of each on the apparatus it is intended to control is fully preserved.

The object of my present invention, therefore, is to insure accurate synchronism of the distributing apparatus and the accurate transmission of every signal at the instant when made, both effects being secured through the instrumentality of a single-line wire connecting stations.

To these ends my invention consists in a novel distributer which assures a return-path for the synchronizing-current at all times, and which gives the signaling-current controlled by each operator the use of the same path at the proper time.

My invention also embodies apparatus and circuits, the novel features of which will hereinafter be fully pointed out in this specification, and then definitely indicated in the appended claims.

In the drawings, Figures 1 and 2 show a system embodying my invention. Fig. 3 shows a part of the apparatus at a station, a different form of generator for the signaling-current being substituted for the induction-coil shown in Figs. 1 and 2.

The synchronizing apparatus used in the present system is in all respects similar to that illustrated and described in my prior applications. As its mode of operation was fully and clearly set forth in said applications, it will be necessary only to briefly describe it here.

At the sending-station X is an ordinary direct current-electric motor, M′, driven by an independent battery, MB′, and provided with an armature, A′ A′, of the ordinary Siemens "H" type. This armature is connected through the commutator $c'$ and brushes $br+$ $br-$ to the motor-battery. The armature A′ A′, instead of being a simple closed coil, is broken at its middle point, and the two terminals thus formed are secured to two insulated contact-rings, $r'$ $r'$, upon which the brushes $b'$ $b'$ bear. To these brushes an external loop, $Ll$, including the coils of a polarized relay, P′, is connected. The armature-circuit is therefore closed through this independent external loop. From the operation of such machines it follows that a reversed current will circulate in the loop L$l$, a reversal occurring at each half-revolution of the armature, this reversal being an incident of the two-part commutator $c'$ $c'$, for it is evident as the armature-spindle turns each segment of the commutator will be brought into alternate engagement with the brushes $br+ br-$. These reversed currents cause the armature $t'$ of the polarized relay to vibrate between the two contact-stops $e'$ $e^2$, the armature being swung to one side or to the other at each reversal of current in the armature and loop L'. The pivotal point of the armature $t'$ is in circuit with a main line, ML, connecting station X with a distant station or stations. The contact-stops $e'$ $e^2$ are connected to the opposite poles of a battery, L' B', the middle point of which is grounded at E' through brush $z'$ in a manner presently to be described. It will be evident, therefore, that as the motor M' operates the relay-armature $t'$ will throw reversed currents alternately over the line ML, and that each impulse sent over the line will correspond to a half-revolution of the armature A' A'. The line-wire ML passes to a distant station or stations, the coils of a polarized relay, P$^2$, being interposed in the circuit at each station, and the armature $t^2$ of this polarized relay will be actuated by the reverse impulses sent to line, and will vibrate in unison with and respond to the vibrations of the relay-armature at station X, the relay P$^2$ at station Y, thus beating the half-revolution of the armature of the motor M' at station X. The relay at the distant station Y has its armature $t^2$ playing between two contact-stops, $e^3$ $e^4$, which contact-stops are electrically connected to the opposite poles of the battery L$^2$ B$^2$, the middle point of which is electrically connected with the pivotal point of the relay-armature through the field-magnet coils $k^2$ $k^2$ of a motor, M$^2$, at station Y, as shown in Fig. 2. From these connections it follows that as the tongue of the relay P' at the station X vibrates to and fro it will send alternate reversed currents through the field-coils of the motor M$^2$ at station Y, and that the field-magnetism will be reversed at each vibration of the tongue of the polarized relay P'.

The armature A$^2$ A$^2$ of the motor M$^2$ is supplied with a continuous current from an independent source, MB$^2$, the terminals of the armature-coils being connected to contact-rings $r^2$ $r^2$, on which bear brushes $b^2$ $b^2$, connected to the poles of said battery. Having thus a direct current in the armature and an alternating field, this motor will revolve and its armature will turn precisely one-half a revolution at each reversal of current in the field-magnet coils; but as the reversals of current are simultaneous with the vibrations of the tongue of the relay P', which are controlled by the motor M', it follows that the two motors at X and Y must revolve in unison with each other, the half-revolutions in the armature of one machine corresponding precisely with the half-revolutions of the armature in the other. I prefer to have the line-wire ML a thoroughly insulated line, both the synchronizing-current and the signaling-current returning by earth through the branches at the stations, a suitable resistance, R$h$, being interposed at each station to insure a due proportion of current passing through the station branch. The several stations of the system will therefore be connected in multiple arc with reference to the line-wire ML and its return.

At each station is a current-distributer driven by or geared to the station-motor. By the term "distributer" as used in this specification I mean a series of contacts or segments progressively engaged by a contact device or brush, so that when the distributer is operated by the driving-motor successive engagements of the contacts will be made and local branch circuits connected to the contacts will be successively connected to line. This distributer consists, as at station X, of a trailer Tr' Tr$^2$, driven by the armature of the motor and kept sweeping over a table of contact-segments. These segments are shown alternately shaded and light in the drawings, and are insulated from each other. Besides the outer ring of segments there is a series of inner insulated segments, 1$^c$ 2$^c$ 3$^c$, &c., concentric with the light segments 1$^a$ 2$^a$ 3$^a$, &c. The distributer shown in the drawings is arranged for a sextuplex system. The capacity of the system can be increased by making a larger number of light segments. The shaded segments are electrically connected with a common conductor, $i'$, which is connected by a wire, $l^{21}$, with an earth-plate, E'. The station-segments 1$^a$ 2$^a$, &c., have each a connection with a separate local branch or station through a switch, W'. The segments 1$^c$ 2$^c$, &c., have each a connection with the middle point of a split battery, B$l'$, the opposite poles of which are connected with the contacts $v'$ $v'$ of a reversing-key, K', connected with the inducing-circuit of an induction-generator, I', and the other terminal of the inducing-circuit is connected through a switch, $w'$ $y'$, with a brush, $s'$, bearing on the hub of the trailer, Tr'. The switch W' is provided with three contacts, one, R$c'$, for receiving, one, S$d'$, for sending, and one, S$y'$, on which the switch normally rests for synchronizing. The receiving-contact is connected with the earth-plate E' through the coils of a polarized relay, R$r'$, or other instrument adapted to respond to high-tension current. The sending-contact is connected with one terminal of the induced circuit of the signaling induction-generator, the other terminal of which is connected with earth-plate E' through the coils of polarized relay R$r'$. The synchronizing-contact is connected directly with the earth-plate E'. When any local branch is not in use—that is to say, is not sending or receiving a message—the switch is allowed to remain on the synchronizing-contact S$y'$.

The distributer-connections at the several local stations are identical, except that at the station X no rheostat $Rh$ is required, this being the generating-station for the synchronizing-current, so that the description above given with reference to station X will apply equally well to station Y and any other stations of the system. The two parts of the trailer $Tr'$ $Tr^2$ may be insulated from each other or not, as desired. I prefer to insulate them, as they have different functions. Brush $Tr'$ co-operates with the inner series of segments, $1^c$ $2^c$ $3^c$, &c., and brush $Tr^2$ co-operates with the outer series, $1^a$ $2^a$, &c. Only one local branch circuit is shown at each station X and Y. It will of course be understood that as many branches may be connected to the segments $1^a$ $2^a$, &c., of the distributer as may be desired. If the local branches radiate from a central point, several or all will be used. If only one branch is desired, as in a way-station, only one segment will be used for that station.

From what has been described it will be seen that at each station at which a distributer is located there are a series of synchronizing-contacts, $1^b$ $2^b$, &c., connected to the return-circuit, in the present embodiment of my invention, to the earth by a direct branch, $l^{21}$ $l^{22}$, stations X and Y; and that there are another series of contacts, $1^a$ $2^a$, &c., which always have a connection to earth and this is of high or low resistance, accordingly as the switch W' rests on the sending and receiving contacts or on the synchronizing-contacts $Sy'$. These return branches at the stations for the synchronizing-current constitute an important feature of the invention—viz., that during such times as the signaling-distributer segments are not in circuit the synchronizing-current has a low-resistance branch to earth, no receiving-instruments being then in circuit, and it maximum efficiency is obtained.

Another distinctive feature of my invention is that the synchronizing-current, by reason of these connections of the distributer-segments, is on line practically all of the time.

The operation of my system will now be understood. In the drawings the apparatus is in a condition for an operator at X to send to an operator at Y. The motor M' is in continuous operation under the influence of current from battery MB'. The reversals of current in the armature-loop $Ll$ keeps tongue $t'$ of relay P' in vibration. In the position of the tongue shown at X a current passes from the left wing of battery L' B' over circuit $m'$, contact $e'$, tongue $t'$, line ML, rheostat $Rh$, brush $z^2$ at station Y into the distributer at Y. At the distributer there are two paths to earth at Y in the condition now being described—one when it rests on the station-segment $1^a$ by way of $Tr^3$ $Rc^2$, polarized relay $Rr^2$, and earth-plates, and the other when it passes to the shaded segments $1^b$ $2^b$, &c., by way of ring $i^2$ and wire $l^{22}$ to earth-plate. From the earth-plate the current returns to station X, and by way of plate E', wire G', relay $Rr'$, wire $l'$, high-resistance coil $p'$, switch $w'$, segment $1^a$, trailer $Tr^2$, brush Z', and connecting-wire to opposite pole of left wing of battery L' B'. The synchronizing-current is thus provided with a complete circuit at all times. When the switches W' W² rest on their normal contacts $Sy'$ $Sy^2$, there is always a low-resistance path irrespective of the position of the trailer, for the light segments have then each a direct connection with earth. When the trailers $Tr^2$ $Tr^3$ pass to segments $1^a$ $2^a$, &c., the synchronizing-current will be grounded through the branch corresponding to that segment. In order to prevent the receiving-relay $Rr^2$ at any station from operating the local sounder under the influence of the synchronizing-current the local stop $d^2$ is put on the side away from the direction in which the synchronizing-current would pull it, for it will be remembered that as the synchronizing-current is reversed only at the half-revolutions of the armature the portion which passes through the relay $Rr^2$ will always be of the same polarity, provided the number of the revolutions of the distributer is an integral multiple of the revolutions of the armature. As it rarely happens, however, that all of the operators on the line are simultaneously operating, a low-resistance earth will usually exist through contact $Sy^2$. Moreover, the only work required of the synchronizing-current is to vibrate the relay-armatures $t'$ $t^2$ once for each half-revolution of the armature, and the armature remaining where driven by the last impulse, unless a reversal of synchronizing-current occurs, and as several shaded segments are brought under the trailer in each half-revolution of the armature the synchronizing apparatus cannot fail. It is only necessary to insure accuracy of signaling that the signaling-current shall be of a character which will not disturb relays P' P², and will yet operate relays $Rr'$ $Rr^2$. I accomplish this end by winding relays P' P² with coarse wire and relays $Rr'$ $Rr^2$ with fine wire and using higher tension currents for signaling. Such currents may flow through the coarse-wire relays and will not affect them, but will actuate the fine-wire relays. At each station is a generator of current having the requisite signaling-tension.

A large number of battery-cells might be used; but I prefer to adopt an induction-generator. (Shown in Figs. 1 and 2 as a simple induction-coil, and in Fig. 3 as a dynamo-electric machine.)

I will first describe the action with the induction-coil, and will then show how the dynamo-electric machine may replace it.

When the operator at X depresses his key K', the right wing of battery $Bt'$ will have for the terminals of its circuit the arm $Tr'$ of the trailer and the segment $1^c$ In order to insure the induced wave of signaling-current being developed at the exact instant when the line-connection of its induced circuit is completed at the segment $1^a$, the arms $Tr'$ $Tr^2$ of the trailer are rigid with respect to one another, and segments $1^a$ and $1^c$ are so spaced that the arms of the trailer will simultaneously bear on their co-operating segments. They are preferably so arranged that the station-segment $1^a$ shall be engaged by its arm a little later than the segment $1^c$, so as to smother the induced wave due to the make of the inducing-circuit, and that arm $Tr^2$ shall remain on its segment a little longer than the arm $Tr'$ does on its segment. This insures the strong induced impulse due to a break going to line. This may be done by putting the trailer-arms at a slight angle to each other or setting the segments $1^a$ and $1^c$ slightly out of the same diametrical plane in a manner as described in a former application, No. 288,294. It will therefore be evident that every time arm $Tr'$ leaves its segment $1^c$ the inducing-circuit through right wing of battery $Bt'$, wires $s'$, segment $1^c$, arm $Tr'$, switch $w'$ $y'$, inducing-coil of generator, and key $K'$ will be ruptured and an induced wave of definite polarity will pass from earth $E'$, wire $G'$, relay $Rr'$, wires $l'$, induced coil $p'$ of generator, switch $W'$, segment $1^a$, arm $Tr^2$, brush and wires $z'$, left wing of battery $L'$ $B'$, wires $m'$, contact $e'$, tongue $t'$, line ML, rheostat $Rh$ at station Y, brush $z^2$, arm $Tr^2$, switch $W^2$, (then on receiving contact,) wire $r^2$, polarized relay $Rr^2$, and earth-plate $E^2$. When the key $K'$ is depressed as in operating, a wave of opposite polarity will be sent to line by reason of the opposite wing of the battery $Bt'$ being connected to inducing-coil of $I^2$. The tongue of receiving-relay $Rr^2$ will thus normally be held against the open contact of a local circuit, $d^2$, including a sounder, $D^2$; but when a signaling-wave is sent the tongue will close the sounder-circuit. The distributers will be driven at such a speed that at least one induced impulse will be sent to line in a space of time occupied by a rapid operator in making the shortest signal of the adopted code, as a dot in the Morse code. The sounder will thus beat the longer and shorter times during which the key is held down, and the transmission of signals is assured.

At all times when an operator is not on duty his switch will bear on the synchronizing-contact, so that for the segment corresponding to his station there will be a low-resistance path for the synchronizing-current to ground. When, however, he is on duty and ready to respond to a call which may come to him from any other station of the system, he will place his switch on the receiving-contact.

In Fig. 3 a dynamo-electric machine, $Dy$, is substituted for the induction-coil shown in the other figures, the field-magnet circuit of the dynamo-machine being connected in the circuit $s'$ and corresponding to the low-resistance coil of the induction-generator. The armature of the dynamo-machine will be driven by a belt, and the terminals of the armature-circuit will be connected with the wires $l'$, the armature-coils thus corresponding to the high-resistance coil of the generator hereinbefore described. Only such parts of the distributer are shown in Fig. 3 and of the synchronizing apparatus as are necessary to illustrate the relation of the dynamo to the other parts of the station apparatus. The armature of the dynamo revolves freely at all times when the field-magnet circuit is open, and as this circuit is closed only when the trailer-arm $Tr'$ bears on the segment $1^c$ corresponding to the station it follows that simultaneously with the closure of the field-magnet circuit an induced wave of electricity will be thrown to line through wire $l'$, switch $W'$, segment $1^a$, trailer-arm $Tr^2$, wire $z'$, left wing of battery $L'$ $B'$, wire $m'$, and armature of relay $P'$.

Each main station at which more than one local station is connected is provided with means for connecting said local to any desired station of the system. This may be done by an ordinary plug and flexible connection or other well-known devices.

In another pending application, filed by me October 16, 1888, Serial No. 288,274, I have described a system of multiplex telegraphy in which a vibrating rheotome is used as the circuit-breaker for the induction-coil in lieu of the circuit-breaker driven by the synchronous motor which I have described in the present specification. In said other system the synchronizing-current was not provided with direct or low resistance connections to the earth return, but said synchronizing-current traversed the resistance of the receiving apparatus.

Having thus described my invention, what I claim as new, and desire to secure by Letters Patent, is—

1. In a system of multiplex telegraphy, the combination of an insulated line-wire connecting different stations, synchronously-moving electric motors at the stations controlled by a practically continuous current on said line-wire, current-distributers driven by said motors, the segmental contacts of said distributers being all in the synchronizing-circuit, a source of synchronizing-current, direct return branches at the stations for said current controlled by the distributers, local branches at the several stations successively connected with the line-wire and return by said distributers, a source of signaling-current, and telegraphic transmitting and receiving-instruments co-operating with the several local branches.

2. In a system of multiplex telegraphy, the combination of an insulated line-wire connecting different stations, synchronously-moving electric motors at the stations controlled by a practically continuous current on said line-wire, current-distributers driven by said motors, the segmental contacts of said distributers being all in the synchronizing-circuit, a source of synchronizing-current, direct return branches at the stations for said current controlled by the distributers, local branches at the several stations successively connected with the line-wire and return by said distributers, a source of signaling-current of different electro-motive force from the synchronizing-current, transmitting-instruments for throwing the signaling-current on line, and receiving-instruments to respond to the signaling-current.

3. In a system of multiplex telegraphy, the combination of an insulated line-wire connecting different stations, synchronously-moving electric motors at the stations controlled by a practically continuous current on said line-wire, current-distributers driven by said motors, the segmental contacts of said distributers being all in the synchronizing-circuit, a source of synchronizing-current, direct return branches at the stations connected to insulated contacts at the distributer, local branches at the several stations connected to independent contacts at the distributer, transmitting and receiving apparatus at the local stations, and a switch for connecting either with the local branch.

4. In a system of multiplex telegraphy, the combination of an insulated line-wire connecting different stations, synchronously-moving electric motors at the stations controlled by the current on said line-wire, current-distributers driven by said motors, a source of synchronizing-current, direct return branches for said current at the station connected to insulated contacts at the distributer, local branches at the several stations connected to independent contacts at the distributer, and a switch in each local branch provided with three contacts controlling receiving apparatus, sending apparatus, and a direct connection with the return-circuit, respectively.

5. In a system of multiplex telegraphy, the combination of an insulated line-wire connecting different stations, synchronously-moving current-distributers at the several stations, the segmental contacts of said distributers being all in the synchronizing-circuit, a source of synchronizing-current at one station, low-resistance return branches at the stations connected to insulated contacts at the distributers, independent signaling-contacts at the distributer, and a switch for connecting the signaling-contacts with transmitting and receiving apparatus.

6. In a system of multiplex telegraphy, the combination of an insulated line-wire connecting different stations, synchronously-moving current-distributers at the several stations, the segmental contacts of said distributers being all in the synchronizing-circuit, a source of synchronizing-current for controlling said distributers, low-resistance return branches at the stations connected to insulated contacts at the distributers, independent contacts at the distributers connected with local stations, a source of signaling-current of different tension from the synchronizing-current, transmitting devices at the local stations for throwing said signaling-current on line when desired, and receiving-instruments at the local stations adapted to respond to the signaling-current.

7. In a system of multiplex telegraphy, the combination of an insulated line-wire connecting different stations, synchronously-moving current-distributers at the several stations, a source of practically continuous synchronizing-current for controlling said distributers, low-resistance return branches at the stations connected to insulated distributer-contacts, independent signaling-contacts connected to local branches, and induction-generator for developing the signaling-current, the induced circuit of the generator being connected to the line-circuit through the signaling-contact, a key in the inducing-circuit of the generator, and means for varying the current in the inducing-circuit of said generator when the station-signaling contact is engaged.

8. In a system of multiplex telegraphy, the combination of an insulated line-wire connecting different stations, synchronously-moving current-distributers at the several stations, a source of synchronizing-current for controlling said distributers, low-resistance return branches at the stations connected to insulated distributer-contacts, independent signaling-contacts connected to local branches, a constantly-driven dynamo-electric generator for developing the signaling-current, said generator having independent field-magnet and armature-circuits, connections between the induced circuit of the generator and the station-signaling contact, a key in the inducing-circuit, and means for varying the current in the inducing-circuit when a signaling-contact is engaged.

9. In a system of multiplex telegraphy, the combination of an insulated line-wire connecting different stations, segmental signaling-contacts connected to local branches, a trailer progressively engaging said contacts, synchronizing-contacts having a low-resistance return engaged by the trailer-arm, all of said contacts being in the synchronizing-circuit, an induction-generator having contacts in its inducing-circuit engaged by a distributer simultaneously with the signaling-contacts, a key and source of energy in said inducing-circuit, and a switch for connecting the induced circuit of said generator to line.

In testimony whereof I affix my signature in presence of two witnesses.

FRANCIS JARVIS PATTEN.

Witnesses:
AUGUSTUS MERRITT,
H. C. PATTEN.